US012794308B2

(12) United States Patent
Rohoza et al.

(10) Patent No.: US 12,794,308 B2
(45) **Date of Patent: *Nov. 10, 2026**

(54) ELECTRIC MACHINE INCLUDING AN AIR COOLING SYSTEM

(71) Applicants: Regal Beloit Australia Pty Ltd, Rowville (AU); Regal Beloit America, Inc., Beloit, WI (US)

(72) Inventors: Rafal Pawel Rohoza, Rowville (AU); Alexander Julian Baer, Melbourne (AU); Greg Heins, Melbourne (AU); Mark Thiele, Rowville (AU); Jeffrey William Crosson, Dayton, OH (US); Nathan August Bulman, Dayton, OH (US)

(73) Assignees: Regal Beloit America, Inc., Milwaukee, WI (US); Regal Beloit Australia Pty Ltd, Rowville (AU)

( * ) Notice: Subject to any disclaimer, the term of this patent is extended or adjusted under 35 U.S.C. 154(b) by 204 days.

This patent is subject to a terminal disclaimer.

(21) Appl. No.: 18/734,871

(22) Filed: Jun. 5, 2024

(65) Prior Publication Data

US 2024/0333082 A1 Oct. 3, 2024

Related U.S. Application Data

(63) Continuation of application No. 17/646,602, filed on Dec. 30, 2021, now Pat. No. 12,166,400.

(51) Int. Cl.

| | |
|---|---|
| ***H02K 5/20*** | (2006.01) |
| ***H02K 9/06*** | (2006.01) |

(Continued)

(52) U.S. Cl.

CPC ............... *H02K 5/207* (2021.01); *H02K 9/06* (2013.01); *H02K 9/227* (2021.01); *H02K 11/30* (2016.01)

(58) Field of Classification Search

CPC .......... H02K 9/06; H02K 9/227; H02K 5/207; H02K 11/30; H02K 11/34; H02K 1/2793; H02K 1/2795; H02K 1/2798

See application file for complete search history.

(56) References Cited

U.S. PATENT DOCUMENTS 9,467,030 B2 10/2016 Camilleri et al.
11,509,179 B2 * 11/2022 Lee .......................... H02P 6/00

(Continued)

FOREIGN PATENT DOCUMENTS

DE 102015110659 A1 1/2016

*Primary Examiner* — Oluseye Iwarere
*Assistant Examiner* — Masoud Vaziri
(74) *Attorney, Agent, or Firm* — Armstrong Teasdale LLP

(57) ABSTRACT

An electric machine includes a housing having an air intake, an air outlet, and defining an air passage therein. The air passage includes a first channel extending from the air intake in a radial direction and a second channel extending in the radial direction to the outlet. The electric machine further includes a motor assembly positioned within the housing that includes a shaft that rotates about a rotational axis that is generally perpendicular to the radial direction. The electric machine further includes an electronics assembly within the housing interior and a heat sink positioned at least partially within the air passage and thermally connected to the electronics assembly. Operation of the motor assembly draws an ambient airflow into the air passage in the radial direction through the air intake, directs the airflow along the heat sink, and exhausts the airflow through the air outlet in the radial direction.

20 Claims, 7 Drawing Sheets

(51) Int. Cl.
*H02K 9/22* (2006.01)
*H02K 11/30* (2016.01)

(56) References Cited

U.S. PATENT DOCUMENTS

| | | | | |
|---|---|---|---|---|
| 2014/0265664 | A1* | 9/2014 | Camilleri | H02K 9/06<br>310/59 |
| 2016/0079824 | A1* | 3/2016 | McKinzie | H02K 5/207<br>310/58 |
| 2016/0226333 | A1* | 8/2016 | Falguier | H02K 11/33 |
| 2023/0047487 | A1* | 2/2023 | Coles | H02K 9/10 |

* cited by examiner

ELECTRIC MACHINE INCLUDING AN AIR COOLING SYSTEM

CROSS REFERENCE TO RELATED APPLICATIONS

This application is a continuation of U.S. patent application Ser. No. 17/646,602, filed Dec. 30, 2021, the contents of which are hereby incorporated by reference in its entirety.

BACKGROUND

The field of the disclosure relates generally to electrical machines, and more particularly, to air cooling systems for electric machines.

One of many applications for an electric motor is to operate a pump or a blower. The electric motor may be configured to rotate an impeller within a pump or blower, which displaces a fluid, causing a fluid flow. Many gas burning appliances include an electric motor, for example, water heaters, boilers, pool heaters, space heaters, furnaces, and radiant heaters. In some examples, the electric motor powers a blower that moves air or a fuel/air mixture through the appliance. In other examples, the electric motor powers a blower that distributes air output from the appliance.

A common motor used in such systems is an alternating current (AC) induction motor. Typically, the AC induction motor is a radial flux motor, where the flux extends radially from the axis of rotation. Another type of motor that may be used in the application described above is an electronically commutated motor (ECM). ECMs may include, but are not limited to, brushless direct current (BLDC) motors, permanent magnet alternating current (PMAC) motors, and variable reluctance motors. Typically, these motors provide higher electrical efficiency than an AC induction motor. Some ECMs have an axial flux configuration in which the flux in the air gap extends in a direction parallel to the axis of rotation of the rotor.

One problem associated with electric machines is that it is necessary to cool them because they generate heat, which reduces their efficiency and useful life. Motor components such as the stator and electronics boards generate high temperatures and are subjected to substantial thermal stresses. Accordingly, efficient motor cooling systems are necessary to prevent overheating of the motor components and to improve the overall electrical and mechanical performance and lifetime of the motor. Some known electrical machines may be air cooled by blowing air through or over them. However, some known air cooling designs are inefficient. For example, at least some known electrical machines include at least one air intake and/or air outlet that is defined on or near an axial end of the machine. As result, such machines are often not well-suited for mounting in tight axial configurations, which can obstruct the at least one air intake and/or air outlet.

BRIEF DESCRIPTION

In one aspect an electric machine is provided. The electric machine includes a housing having an air intake, an air outlet, and defining an air passage therein. The air passage includes a first channel extending from the air intake in a radial direction and a second channel extending in the radial direction to the outlet. The electric machine further includes a motor assembly positioned within the housing that includes a shaft that rotates about a rotational axis that is generally perpendicular to the radial direction. The electric machine further includes an electronics assembly within the housing interior and a heat sink positioned at least partially within the air passage and thermally connected to the electronics assembly. Operation of the motor assembly draws an ambient airflow into the air passage in the radial direction through the air intake, directs the airflow along the heat sink, and exhausts the airflow through the air outlet in the radial direction.

In another aspect a housing for containing a motor is provided. The housing includes an air intake, an air outlet, and an air passage extending within an interior of the housing. The air passage includes a first channel extending from the air intake in a radial direction and a second channel extending in the radial direction to the outlet, the radial direction being generally perpendicular to a rotational axis of the motor housing. The housing further includes an electronics assembly within the housing interior and a heat sink positioned at least partially within the air passage and thermally connected to the electronics assembly. Operation of the motor draws an ambient airflow into the air passage in the radial direction through the air intake, directs the airflow along the heat sink, and exhausts the airflow through the air outlet in the radial direction.

In yet another aspect, an electric motor is provided. The electric motor includes a housing having an air intake, an air outlet, and defining an air passage extending therein. The air passage includes a first channel extending from the air intake in a radial direction and a second channel in flow communication with the first channel, the second channel extending in the radial direction to the air outlet. The electric motor further includes a motor assembly positioned within the housing interior that includes a shaft rotatably coupled to the housing and defining a rotational axis of the motor that is generally perpendicular to the radial direction. The electric motor further includes an electronics assembly positioned within the housing interior and a passive heat exchanger positioned at least partially within the air passage and thermally connected to the electronics assembly. Operation of the motor assembly draws an ambient airflow into the air passage in the radial direction through the air intake, directs the airflow along the passive heat exchanger, and exhausts the airflow through the air outlet in the radial direction.

DETAILED DESCRIPTION

Systems and methods described herein provide an electric machine having an air cooling system. Electric machines such as motors typically include a motor assembly and electronics that generate high amounts of heat. To extend the lifetime of the electronics, it is important to keep the operating temperature down. The electric machine disclosed herein includes an air passage that facilitates a cooling airflow to cool an electronics heat sink, which prevents thermal energy from the motor assembly from increasing the electronics temperature and shortening a useful life of the electronics. Additionally, the air-cooling system includes an air intake and an air outlet that are defined radially in the housing. During use, operation of the motor draws ambient air into the air passage through at least one air intake and exhausts the air through at least one air outlet. The at least one air intake and the at least one air outlet direct the air radially into and out of, respectively, the motor housing. As a result, the electrical machine may be mounted in close axial proximity to adjacent structures (e.g., a wall, a pump, etc.), without the axially adjacent structures obstructing airflow into and/or out of the inlet and/or outlet passages.

Figure 1:
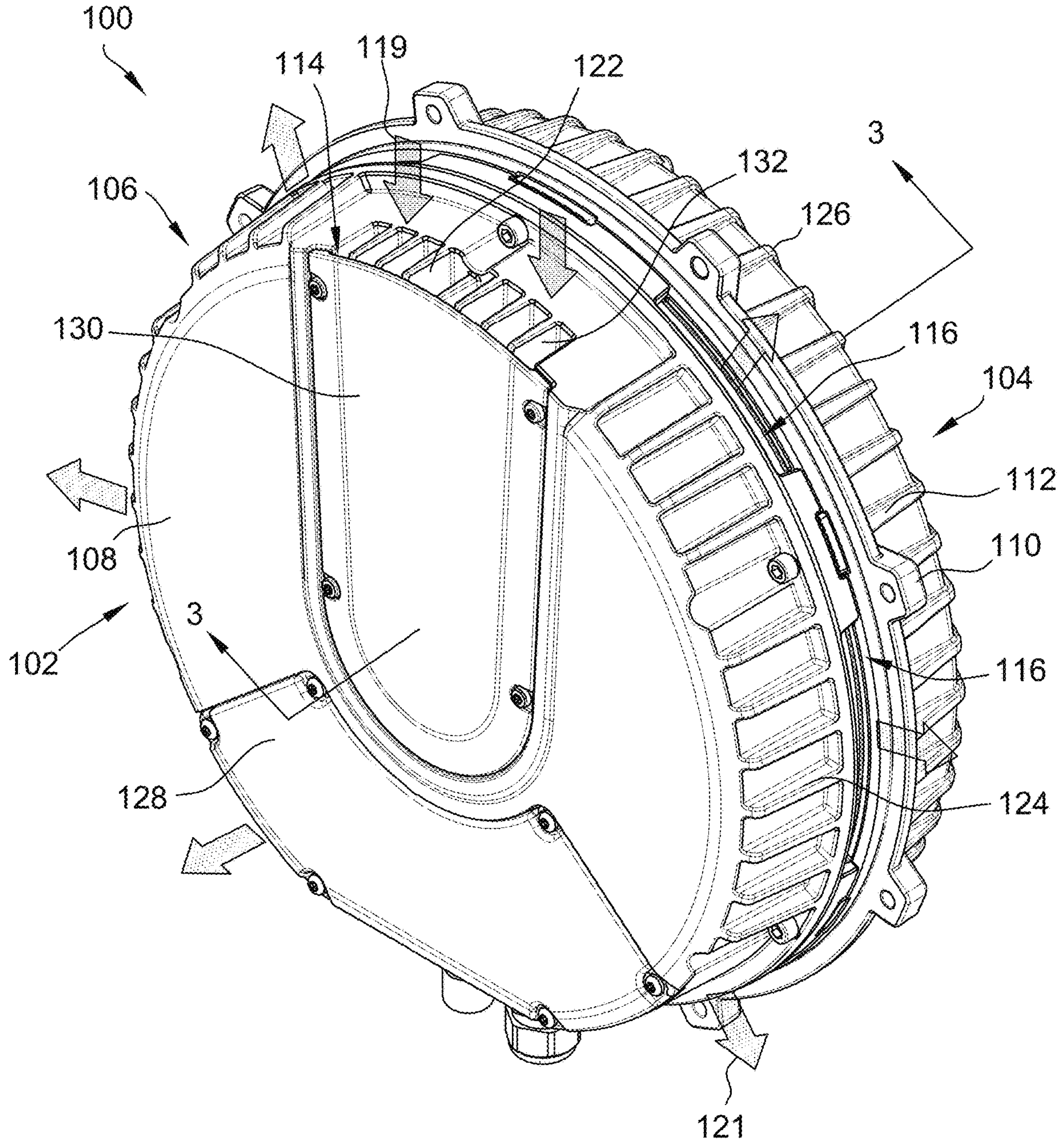
FIG. 1 is a perspective view of an example electric machine.
Figure 2:
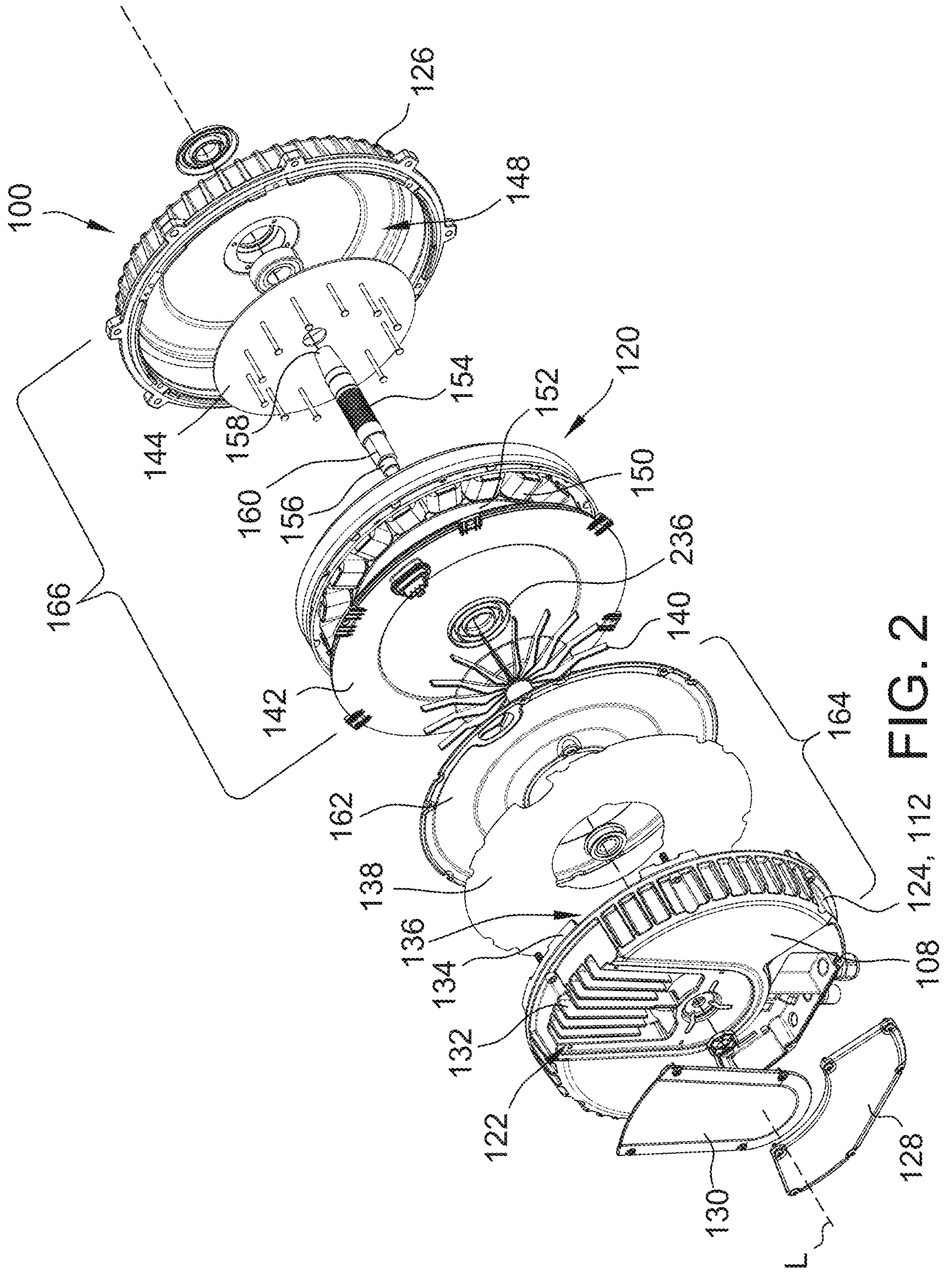
FIG. 2 is an exploded view of the electric machine shown in FIG. 1.

FIG. 1 is a perspective view of an example radial flux electric machine 100 and FIG. 2 is an exploded view of electric machine 100. In the example embodiment, electric machine 100 is an electric motor having a first end 102, and a second end 104. In some implementations, electric machine 100 is rated for 4.5 kilowatts of continuous energy. Alternatively, electric machine 100 may operate as an electric generator and/or be constructed as an axial flux electric machine.

Electric machine 100 includes a housing 106 having a first end wall 108, a second end wall 110, and a peripheral sidewall 112 that extends axially from first end wall 108 to second end wall 110. More specifically, in the example embodiment, housing 106 has a generally cylindrical shape, with peripheral sidewall 112 extending circumferentially around housing 106 between first end wall 108 and second end wall 110, though in other embodiments, housing 106 may have any suitable shape. In the example embodiment, housing 106 is made of a thermally conductive material, such as, for example aluminum and/or any other metal or metal alloy. In other embodiments, housing may be formed of a non-thermally conductive material, such as a polymer. A motor assembly 120 (shown in FIG. 2) is positioned within an interior 148 of housing 106.

Housing 106 further includes at least one air intake 114 and at least one air outlet 116. In particular, in the example embodiment, housing 106 defines a single air intake 114 proximate first end 102 and six air outlets 116. Outlets 116 are circumferentially spaced about peripheral sidewall 112. In other embodiments, housing 106 may define any suitable number of outlets 116 that enables machine 100 to function as described herein. As described in greater detail with respect to FIG. 3, housing 106 further includes an air passage 118 that extends between the at least one air intake 114 and the at least one air outlet 116. In the example embodiment, air intake 114 and air outlets 116 are each defined in peripheral sidewall 112 of housing 106. Operation of motor assembly 120 draws ambient cooling airflow 119 in the radial direction through air intake 114, into the air passage 118, and directs the airflow along a passive heat exchanger 122, which heats the cooling airflow 119. The heated airflow 121 is then exhausted through the air outlet 116 in the radial direction. In the example embodiment, the passive heat exchanger 122 is a heat sink, though in other embodiments, any suitable heat exchanger may be used. For example, and without limitation, in some embodiments, passive heat exchanger 122 may be a thermally conductive plate (not shown).

In some embodiments, housing 106 defines multiple air intakes 114 spaced circumferentially on housing 106. For example, in one such embodiment, housing 106 includes an additional air intake (not shown) approximately 90 degrees about the circumference of housing 106 from air intake 114. In such embodiments, airflow may be drawn into the additional air intake in substantially the same manner as described herein with respect air intake 114. In yet further embodiments, housing defines a plurality of air intakes 114 that are circumferentially spaced about housing 106 in a manner similar to outlets 116. For example, in one such embodiment, housing 106 includes four air intakes (i.e., three additional intakes from the intake 114 shown in FIG. 1), with each of the intakes 114 being circumferentially spaced approximately 90 degrees from adjacent intakes.

In the example embodiment, housing 106 includes a first housing shell 124 and a second housing shell 126 that are coupled together at approximately an axial midpoint between first end wall 108 and second end wall 110. First housing shell 124 includes the first end wall 108 and second housing shell 126 includes the second end wall 110. Peripheral sidewall 112 of housing is defined collectively by first housing shell 124 and second housing shell 126. Alternatively, housing 106 is formed by any suitable number and/or type of components.

Referring to FIG. 2, in the example embodiment, machine 100 further includes an insulating plate 138, a fan 140, a motor cover 142, motor assembly 120, and a yoke plate 144. Housing 106 further includes a terminal cover 128 and a heat sink cover 130 coupled to first housing shell 124 at first end wall 108 of housing 106. Heat sink 122 includes a plurality of fins 132 extending radially within first housing shell 124 to peripheral sidewall 112. First housing shell 124 further includes a plurality of axial projections 134 on the outer peripheral sidewall 112, which define notches 136 circumferentially therebetween. When coupled to the second housing shell 126, e.g., as shown in FIG. 1, the housing shells 124, 126 collectively define the outlets 116 at the notches 136 in first housing shell 124. As a result, in the example embodiment, outlets 116 are defined axially between first housing shell 124 and second housing shell 126. Alternatively, outlets 116 are defined in any suitable fashion. When assembled, motor assembly 120 is contained within second housing shell 126 and a drive electronics assembly 146 (shown in FIG. 3) is contained within first housing shell 124.

Figure 3:
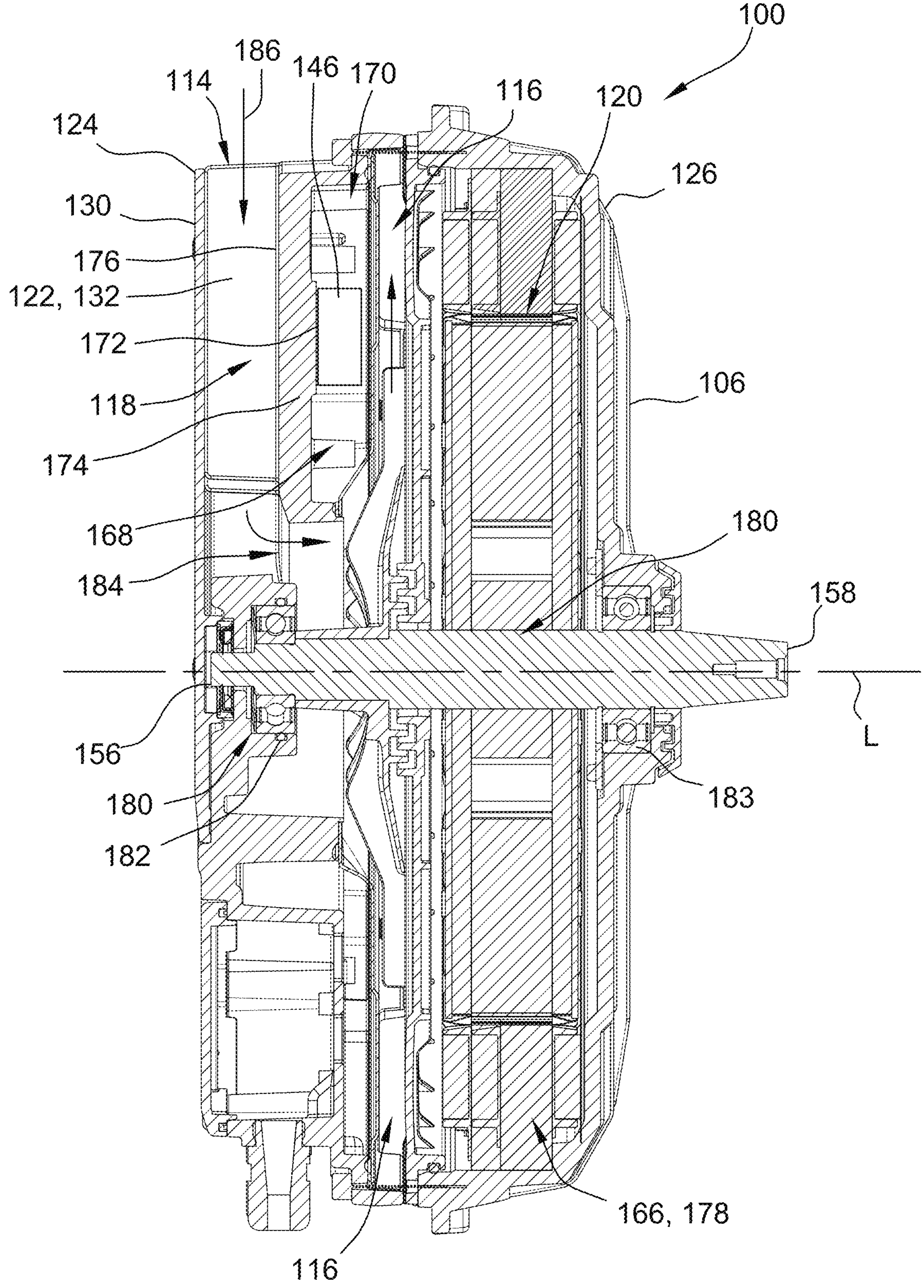
FIG. 3 is cross-sectional view of the electric machine shown in FIGS. 1 and 2, taken along lines 3-3 shown in FIG. 1.

Motor assembly 120 is positioned within housing interior 148 and includes a stator 150, a rotor 152, and a shaft 154 coupled to rotor 152. A plurality of permanent magnets (not shown) are coupled to rotor 152 in any suitable configuration. In the example embodiment, stator 150 is positioned at least partially surrounding rotor 152 in a radial flux configuration. Alternatively, stator 150 may be oriented adjacent rotor 152 in an axial flux configuration. Shaft 154 extends axially between first and second ends 156, 158 and includes a stepped section 160 intermediate the first and second ends 156, 158. Fan 140 couples to shaft 154 at stepped section 160. When assembled, (e.g., as shown in FIG. 3) shaft second end 158 extends from housing 106 for coupling to a component (not shown) to be driven by rotating shaft 154, for example, a pump. In the example embodiment, rotor 152 is rotatable within housing 106 and, more specifically, rotor 152 is rotatable within second housing shell 126 about a rotational axis L that is generally perpendicular to the radial direction. Rotor 152 is driven within stator 150 by electronic control, for example, a sinusoidal or trapezoidal electronic control. In the example embodiment, motor assembly 120 is rated to handle 4.5 kilowatts of continuous energy, though other suitable motors may also be used.

In the example embodiment, first housing shell 124 and drive cover 162 collectively define a drive electronics enclosure 164 of housing 106. Motor cover 142 and second housing shell 126 collectively define a motor enclosure 166 of housing 106. Motor enclosure 166 contains motor assembly 120 therein and drive electronics enclosure 168 contains electronics assembly 146 therein.

Referring to FIG. 3, drive electronics enclosure 168 includes an inner cavity 170 defined by first housing shell 124 and insulating plate 138. Electronics assembly 146 (illustrated schematically in FIG. 3) is received within inner cavity 170. Electronics assembly 146 may include a controller board that facilitates control of a component of electric machine 100, an electronic control that facilitates control of motor assembly 120, and/or any other suitable electronic components. Drive electronics enclosure 168 is substantially air-tight and inner cavity 170 is substantially thermally isolated from other portions of electric machine 100. In particular, inner cavity 170 is substantially thermally isolated from motor enclosure 166 to facilitate preventing transfer of thermal energy to electronics assembly 146, which in many known motors directly affects the useful lifetime of electric machine 100.

Electronics assembly 146 is thermally coupled to heat sink 122, which facilitates removal of thermal energy generated by the electronics from drive electronics enclosure 168. Heat sink 122 is positioned within air passage 118, or optionally, at least partially within air passage 118, for convective communication with the airflow therein and is located proximate air intake 114. In the example embodiment, electronics assembly 146 is mounted on an interior surface 172 of a radial sidewall 174 of first housing shell 124 and heat sink 122 is provided on an exterior surface 176 of the radial sidewall 174. In particular, heat sink 122 includes a plurality of fins 132 extending axially from exterior surface 176 of radial sidewall 174 to heat sink cover 130 and radially within first housing shell 124. In the example embodiment, fins 132 have a generally linear shape, however in other embodiments, fins 132 may have any suitable shape that enables heat sink 122 to function as described herein. Fins 132 are thermally coupled to electronics assembly 146 and transfer thermal energy generated by electronics assembly 146 out of inner cavity 170, as described herein in more detail.

In the example embodiment, motor enclosure 166 defines a motor cavity 178 that contains motor assembly 120 therein. Motor assembly 120 is mounted within motor enclosure 166 and shaft first end 156 extends through an aperture 180 defined in motor enclosure 166. Shaft 154 is mounted to a first bearing 182 and a second bearing 183. First bearing 182 is positioned in an aperture 180 in first housing shell 124. Aperture 180 is sealed by shaft 154 and first bearing 182 such that air does not pass therethrough. Motor enclosure 166 is substantially air-tight and motor cavity 178 is substantially thermally isolated from other portions of electric machine 100. In particular, motor cavity 178 is substantially thermally isolated from electronics enclosure 164 to prevent transfer of thermal energy to electronics assembly 146.

Electric machine 100 includes air cooling system 184 defined by housing 106. Air cooling system 184 generally includes air intake 114, air outlet 116, and air passage 118 defined through housing 16. Air passage 118 facilitates a flow of cooling airflow (shown by arrows 186) therethrough to dissipate heat from heat sink 122.

Figure 4:
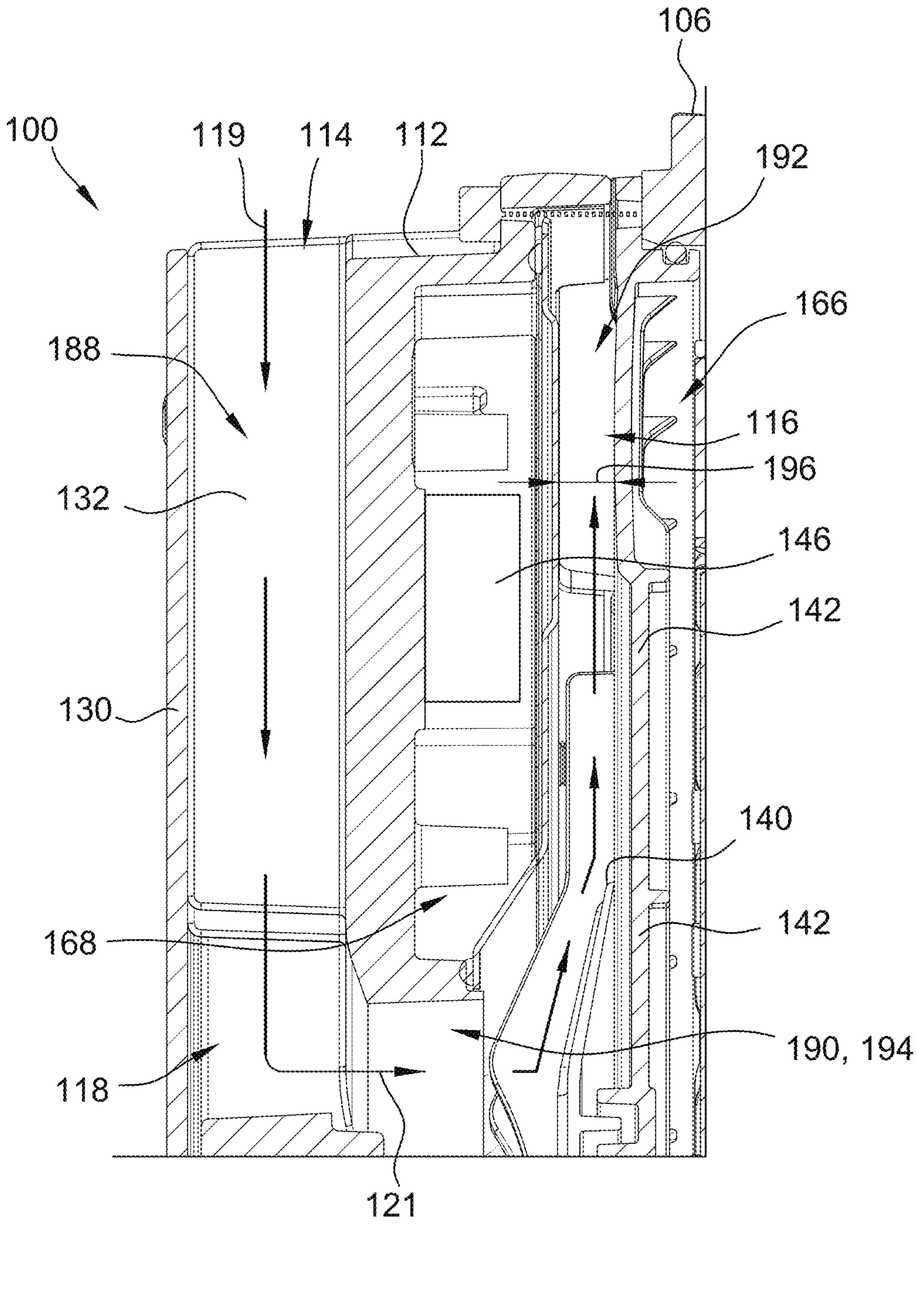
FIG. 4 is an enlarged cross-sectional view of the electric machine as shown in FIG. 3.

Referring to FIG. 4, air passage 118 includes a first channel 188, a second channel 190, and a third channel 192. First channel 188 extends generally radially from peripheral sidewall 112 of housing 106 to a central opening 194 within first housing shell 124. Second channel 190 extends axially within the central opening 194 between heat sink cover 130 and fan 140 and/or motor cover 142. Third channel 192 extends radially to outlets 116 defined in the peripheral sidewall 112.

In the example embodiment, fins 132 are positioned at least partially within passage first channel 188. Fan 140 is coupled to shaft 154 (shown in FIG. 3) and is rotatably mounted at least partially within passage second channel 190 and third channel 192. Rotation of fan 140 generates a negative pressure pocket axially between fan 140 and the cover 130. The negative pressure pocket pulls ambient air 119 into air intake 114 such that the cooling airflow (shown by arrows 119) passes into passage first channel 188. The cooling airflow contacts heat sink 122 and removes heat generated by electronics assembly 146 and transferred through fins 132, forming a heated airflow 121. The heated airflow 121 then passes and into passage second channel 190 and is directed radially outward by fan 140 into third channel 192. From third channel 192, heated airflow 121 is exhausted from housing 106 through air outlets 116. In the example embodiment, air outlets 116 are axially spaced a suitable distance from air intake 114 to facilitate preventing hot exhaust from being drawn back into air intake 114. Notably, in the example embodiment, the cooling airflow 191 enters first housing shell 124 in the radial direction (i.e., generally perpendicular to the rotational axis L (shown in FIG. 3). Additionally, the heated airflow also exits first housing shell 124 in the radial direction. That is, housing 106 is free of any axial air intakes and air outlets. In other words, first axial end wall 108 and second axial end wall 110 do not include any air intakes and/or air outlets. Rather, in the example embodiment, all airflow 119 into cooling passage 118 is directed radially into housing 106 through intake 114 and all airflow 121 exhausted from cooling passage 118 is exhausted radially from housing 106 by outlets 116. As a result, machine 100 may be mounted in tight axial proximity to adjacent structures (e.g., other components of a pump and/or a wall), without the intake 114 and/or the outlets 116 being obstructed.

In the example embodiment, third channel 192 of air passage 118 is defined radially between drive electronics enclosure 168 and motor enclosure 166. Additionally, third channel 192 of air passage extends circumferentially around the fan 140 such that a gap 196 is defined between motor enclosure 166 and electronics enclosure 164 of first housing shell 124. The heated airflow directed by fan 140 into third channel 192 acts as a thermal barrier between motor enclosure 166 and drive electronics enclosure 168, thereby limiting and/or eliminating thermal convection between drive electronics enclosure 168 and motor enclosure 166. Moreover, as shown in FIG. 4, drive electronics enclosure 168 is positioned axially between passageway first channel 188 and passageway third channel 192.

In the example embodiment, air passage 118 does not extend into motor enclosure 166 and motor cover 142 is formed of a thermally non-conductive material, such as plastic. In other embodiments, at least a portion of motor cover 142 may be formed of a thermally conductive material for transferring heat from the motor assembly 120 (shown in FIG. 3) to airflow in the passageway third channel 192. In such embodiments, a heat sink 122 may be coupled to the thermally conductive portion of motor cover 142 to transfer heat from the motor assembly 120 to airflow in the passageway third channel 192. In yet further embodiments motor cover 142 may define one or more openings for directing airflow in air passage 118 into motor enclosure 166 and to provide cooling to motor assembly 120. For example, and without limitation, in one such embodiment, the opening in motor cover 142 is defined radially between fan 140 and peripheral sidewall 112. Moreover, in some such embodiments, second housing shell 126 further includes one or more outlets 116 for the airflow from motor enclosure 166.

Figure 5:
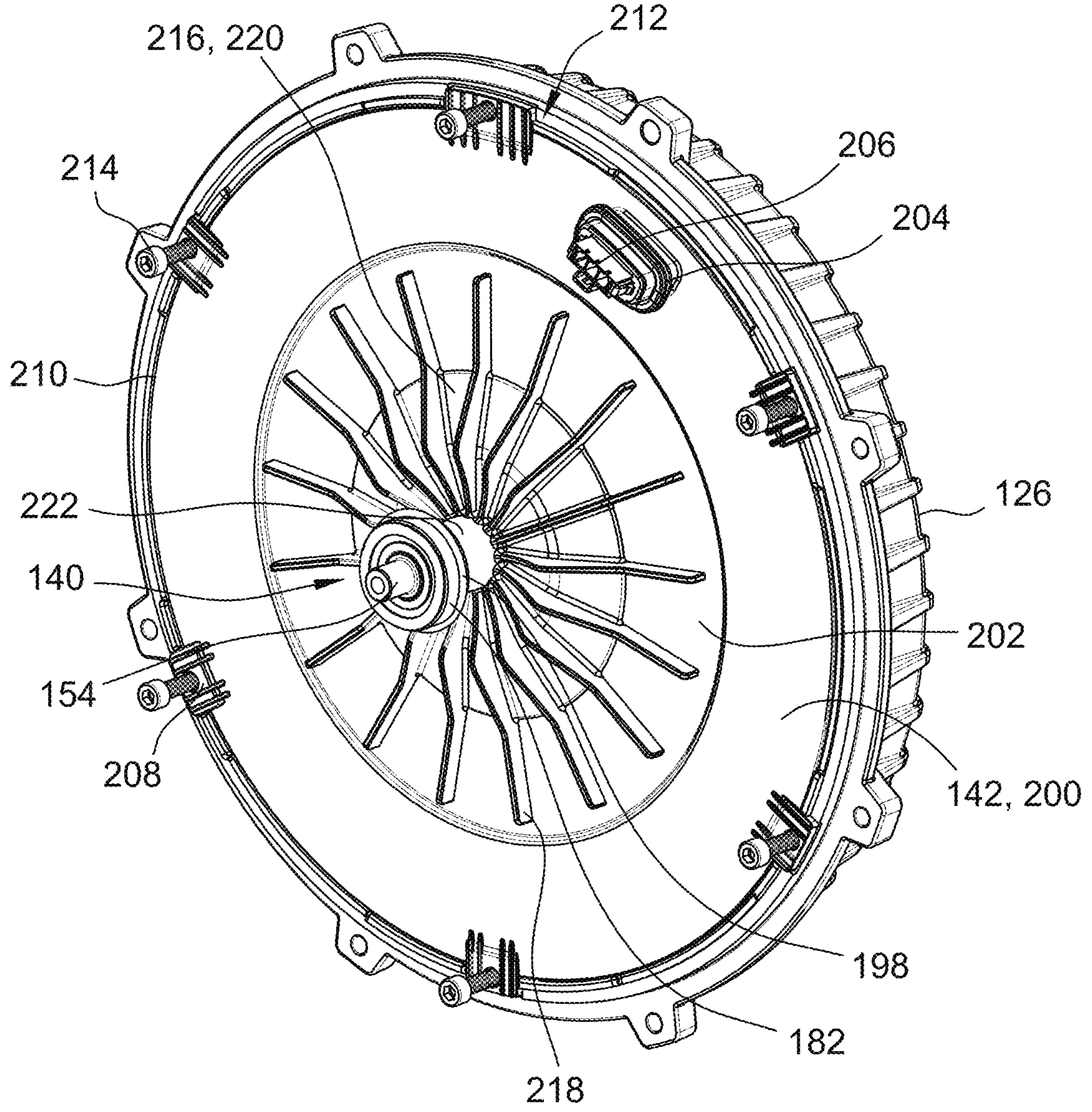
FIG. 5 is a perspective view of the electric machine shown in FIGS. 1 and 2, with components of the electric machine removed to reveal internal construction.
Figure 6:
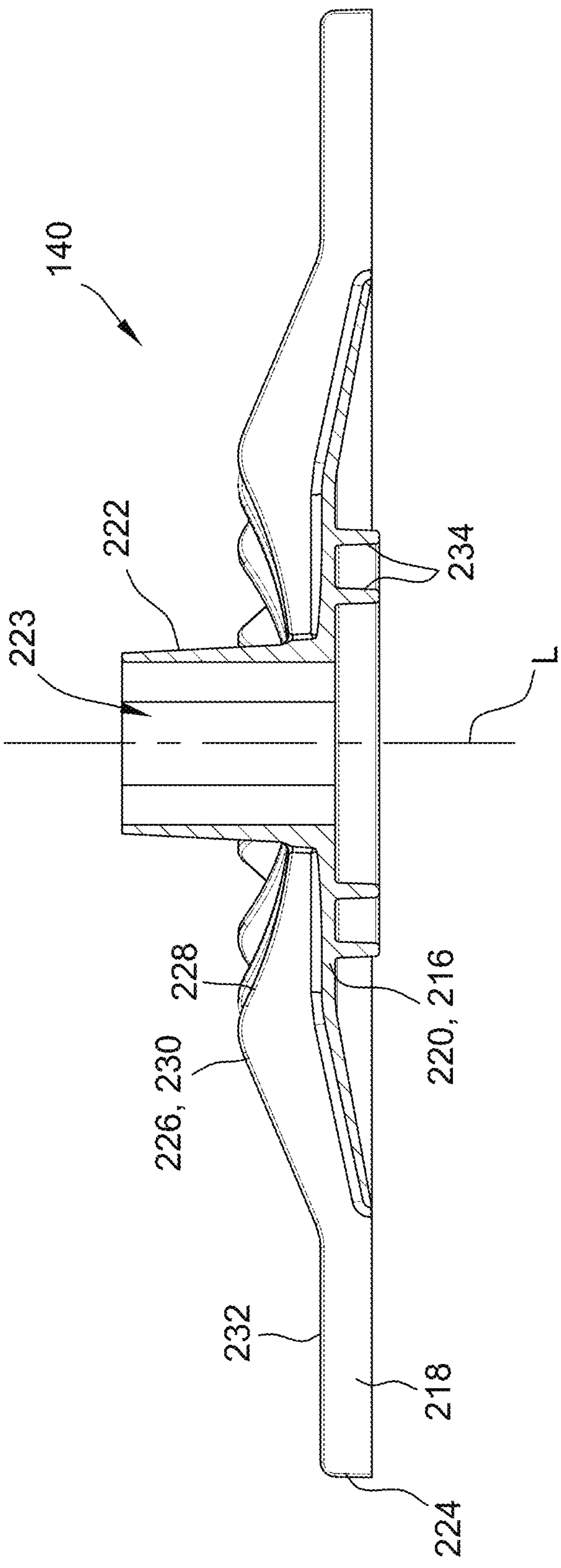
FIG. 6 is a cross-sectional view of a fan used in the electric machine shown in FIGS. 1 and 2.

FIG. 5 is a perspective view of electric machine 100 shown in FIGS. 1 and 2, with components of electric machine 100 removed to reveal internal construction. In particular, in the view of FIG. 5, electronics enclosure 164 and outer covers 128, 130 (shown in FIG. 2) are removed. FIG. 6 is a cross-sectional view of fan 140.

Referring to FIG. 5, in the example embodiment, fan 140 is positioned on motor cover 142 and is rotatably mounted on shaft 154. First bearing 182 is positioned adjacent fan 140 to limit axial movement of fan 140 within machine 100. A seal 198 is fitted on first bearing assembly 182 which seals the flow of fluid from within housing interior 148 (shown in FIG. 2) from exiting first housing shell 124 between first bearing assembly 182 and first housing shell 124.

In the example embodiment, motor cover 142 includes an outer circumferential surface 200 and inner circumferential surface 202 recessed from the outer circumferential surface 200. Fan 140 is positioned on the inner circumferential surface 202 and does not extend to outer circumferential surface 200. Motor cover 142 defines a connector projection 204 projecting axially from the outer surface 200 and into first housing shell 124, when first housing shell 124 is coupled to second housing shell 126 (e.g., as shown in FIG. 3). An electrical connector 206 is received within connector projection 204. Electrical connector 206 facilitates electrically connecting electronics assembly 146 to motor assembly 120 (shown in FIG. 4).

In the example embodiment, motor cover 142 further includes a plurality of mounting flaps 208 radiating outward from a peripheral edge 210 of motor cover 142. Mounting flaps 208 are substantially evenly circumferentially spaced around a peripheral edge 210 of motor cover 142 and are positioned within corresponding mounting grooves 212 defined in second housing shell 126. Each of the mounting flaps 208 define at least one aperture that receives a threaded fastener 214 (e.g., such as a bolt) for fastening motor cover 142 to second housing shell 126. In other embodiments, motor cover 142 may be mounted to second housing shell 126 by any suitable means that enables machine 100 to function as described herein.

As shown in FIG. 6, fan 140 includes a hub 216 and a plurality of blades 218 extending radially outward from hub 216. In the example embodiment, blades 218 are substantially identical to one another and are each evenly circumferentially spaced about hub 216. In other embodiments, some of blades 218 may be different from one another and/or some blades 218 may have different spacing between adjacent blades 218. Hub 216 includes a base 220 and a sleeve 222 that extends axially outward from base 220.

Referring to FIG. 6, in the example embodiment, sleeve 222 defines a central opening 223 that receives the shaft 154 (shown in FIG. 5) therethrough. Each of blades 218 are attached to sleeve 222 and extend radially outward therefrom along base 220 and to distal ends 224. In the example embodiment, fan 140 is formed as an integrally formed single-piece. That is blades 218 and hub 216 are formed as a single-piece. In other embodiments, blades 218 may be formed separately from hub 216 and later attached thereto. Moreover, in some embodiments, fan 140 may include two or more fans (not shown) coupled together to form a single continuous fan.

Blades 218 each extend generally linearly in the radial direction from hub 216 to respective distal ends 224. In particular, in the example embodiment, fan 140 is a "straight blade paddle radial fan". Blades 218 include a front edge 226 having a curved section 228, an oblique section 230, and a distal section 232. Curved section 228 has a concave curvature and extends radially outward from sleeve 222 to oblique section 230. Oblique section 230 is generally linear and extends obliquely relative to the rotational axis L from curved section 228 to distal section 232. Distal section 232 is generally linear and extends substantially perpendicular to the rotational axis (i.e., radially) from oblique section 230 to distal end 224. In other embodiments, any suitable fan 140 and/or blades may be used. For example, and without limitation, in some embodiments, blades 218 may be curved in the radial and/or axial directions.

In the example embodiment, fan 140 further includes a pair of guide rings 234 extending axially from base 220 in a direction opposite sleeve 222. Guide rings 234 are generally annular and are sized to be received within corresponding guide grooves 236 (FIG. 2) on motor cover 142. In other embodiments, fan 140 does not include guide rings 234.

Figure 7:
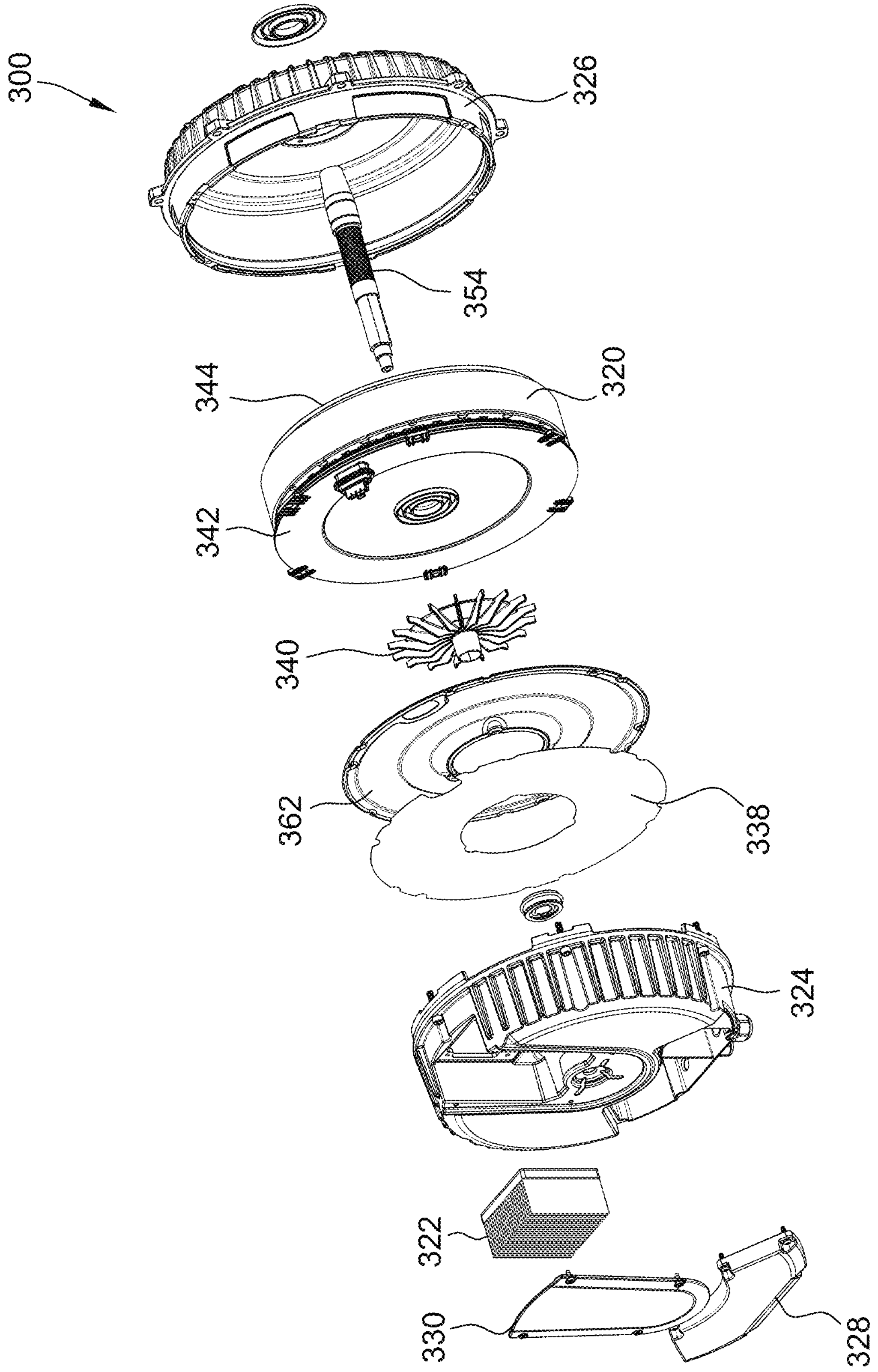
FIG. 7 is an exploded view of another example electric machine.

FIG. 7 is an exploded view of an alternative electric machine 300. Electric machine 300 is similar to the electric machine shown in FIGS. 1 and 2, except electric machine 300 is rated for 8 kilo-watts of continuous energy. Moreover, in the example embodiment, heat sink 322 is provided as a separate component and coupled to housing 306. More specifically, in the example embodiment, heat sink 322 is an extruded insert formed of aluminum, though in other embodiments, heat sink 322 may be formed of any suitable material.

Machine 300 includes a terminal cover 328 and a heat sink cover 330, a passive heat exchanger 322, a first housing shell 324, an insulating plate 338, a drive cover 362, a fan 340, a motor cover 342, a motor assembly 320, and a yoke plate 344, a shaft 354, and a second housing shell 326. First housing shell 324 and second housing shell 326 are configured to be coupled to one another to form a continuous housing of machine in substantially the same manner as described above with respect to housing 106 (shown in FIG. 1). When assembled, motor assembly 320 is contained within second housing shell 326 and a drive electronics assembly, similar to drive electronics assembly 146 (shown in FIG. 3) is contained within first housing shell 234.

Described herein are example methods and systems for electrical machines. The electrical machines include a housing and a motor assembly and an electronics assembly positioned within an interior of the housing. The housing includes an air intake, an air outlet, and an air passage extending within the housing interior. Operation of the motor assembly draws an ambient airflow into the air passage in the radial direction through the air intake, directs the airflow along a heat sink, and exhausts the airflow through the air outlet in the radial direction. The radial intake and outlet design enables the electrical machine to be tightly mounted in the axial direction without obstructing airflow into the housing. Additionally, the motor assembly and the electronics assembly may be substantially thermally isolated to limit heating of the electronics assembly by the motor assembly.

Example embodiments of the electric machine are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the example embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine comprising:

a housing comprising an air intake and an air outlet, said housing defining an air passage extending within an interior of said housing from said air intake to said air outlet;

a motor assembly positioned within the housing interior, said motor assembly comprising a shaft rotatably coupled to said housing and operable to rotate about a rotational axis;

an electronics assembly positioned within the housing interior and axially between the air intake and the air outlet; and a heat sink positioned at least partially within the air passage and thermally connected to said electronics assembly.

2. The electric machine of claim 1, wherein the air passage includes a first channel extending from said air intake in a radial direction and a second channel in flow communication with the first channel, the radial direction being generally perpendicular to the rotational axis.

3. The electric machine of claim 2, wherein the second channel extends in the radial direction to said air outlet.

4. The electric machine of claim 1, wherein operation of said motor assembly draws an ambient airflow into the air passage in a radial direction through said air intake, directs the airflow along said heat sink, and exhausts the airflow through said air outlet in the radial direction, and wherein the radial direction is generally perpendicular to the rotational axis.

5. The electric machine of claim 1 further comprising a fan coupled to said shaft for rotation therewith about the rotational axis, wherein rotation of said fan draws an ambient airflow in through said air intake and exhausts the airflow through said air outlet.

6. The electric machine of claim 5, wherein said fan comprises a hub coupled to said shaft and a plurality of blades extending linearly in a radial direction from said hub, wherein said hub comprises a base and a sleeve coupled to said base and extending axially therefrom.

7. The electric machine of claim 5, wherein said fan comprises a blade including a first edge oriented to face a first channel of the air passage, said first edge comprising a curved section extending in a radial direction.

8. The electric machine of claim 7, wherein said curved section extends in the radial direction from a hub of said fan and axially from a base of said fan.

9. The electric machine of claim 1, wherein the air passage includes a first channel extending from said air intake in a radial direction and a second channel in flow communication with the first channel and extending in the radial direction to said air outlet, wherein the electric machine further comprises an electronics enclosure positioned within said housing, said electronics enclosure containing said electronics assembly therein, wherein a first axial side of said electronics enclosure at least partially defines the first channel and wherein a second axial side of said electronics enclosure at least partially defines the second channel.

10. The electric machine of claim 9, wherein said housing at least partially defines said electronics enclosure.

11. The electric machine of claim 1, wherein said motor assembly comprises a rotor and a stator arranged in a radial flux configuration, and wherein said housing is free of both any axial intakes and any axial outlets.

12. The electric machine of claim 1, wherein said housing comprises a first housing shell and a second housing shell coupled to said first housing shell, said first and second housing shells collectively defining an exterior surface of said housing, wherein said electronics assembly is positioned within said first housing shell.

13. A housing for containing a motor therein, the motor including a shaft that is rotatable about a rotational axis of said housing, said housing comprising:

an air intake;

an air outlet;

an air passage extending within an interior of said housing from said air intake to said air outlet;

an electronics assembly positioned within the housing interior and axially between said air intake and said air outlet; and a heat sink positioned at least partially within said air passage and thermally connected to said electronics assembly.

14. The housing of claim 13, wherein said air passage includes a first channel extending from said air intake in a radial direction and a second channel in flow communication with said first channel, the radial direction being generally perpendicular to the rotational axis.

15. The housing of claim 14, wherein said second channel extends in the radial direction to said air outlet.

16. The housing of claim 13, wherein operation of the motor draws an ambient airflow into said air passage in a radial direction through said air intake, directs the airflow along said heat sink, and exhausts the airflow through said air outlet in the radial direction, and wherein the radial direction is generally perpendicular to the rotational axis.

17. The housing of claim 13 further comprising a first housing shell and a second housing shell coupled to said first housing shell, said first and second housing shells collectively defining an exterior surface of said housing, wherein said electronics assembly is positioned within said first housing shell.

18. The housing of claim 17, wherein said air outlet is defined between said first housing shell and said second housing shell.

19. An electric motor comprising:

a housing comprising an air intake and an air outlet, said housing defining an air passage extending within an interior of said housing from said air intake to said air outlet;

a motor assembly positioned within the housing interior, said motor assembly comprising a shaft rotatably coupled to said housing and operable to rotate about a rotational axis;

an electronics assembly positioned within the housing interior and axially between the air intake and the air outlet; and a passive heat exchanger positioned at least partially within the air passage and thermally connected to said electronics assembly.

20. The electric motor of claim 19, wherein the air passage including a first channel extending from said air intake in a radial direction and a second channel in flow communication with the first channel, the second channel extending in the radial direction to said air outlet, the radial direction being generally perpendicular to the rotational axis.

* * * * *